US012762098B1

(12) United States Patent
Hijar

(10) Patent No.: US 12,762,098 B1
(45) Date of Patent: Oct. 13, 2026

(54) METHOD AND SYSTEM FOR ARTIFICIAL INTELLIGENCE-DRIVEN DATA MIGRATION AND STANDARDIZATION ACROSS SOFTWARE PLATFORMS

(71) Applicant: ProcureLinx, LLC, Arlington, VA (US)

(72) Inventor: Mark Hijar, Arlington, VA (US)

(73) Assignee: ProcureLinx, LLC, Arlington, VA (US)

( * ) Notice: Subject to any disclaimer, the term of this patent is extended or adjusted under 35 U.S.C. 154(b) by 0 days.

(21) Appl. No.: 19/261,858

(22) Filed: Jul. 7, 2025

(51) Int. Cl.
*G06F 16/00* (2019.01)
*G06F 16/21* (2019.01)

(52) U.S. Cl.
CPC .................................. *G06F 16/214* (2019.01)

(58) Field of Classification Search
None
See application file for complete search history.

(56) References Cited

U.S. PATENT DOCUMENTS 7,664,795 B2 * 2/2010 Balin .................... G06F 16/214 717/172
8,818,949 B2 * 8/2014 Cline ...................... G06F 16/27 707/638
9,430,505 B2 * 8/2016 Padmanabhan ....... G06F 16/214
9,747,311 B2 * 8/2017 Buehne ................. G06F 16/214
10,073,869 B2 * 9/2018 Singh .................. G06F 16/2365
11,269,822 B2 * 3/2022 Fabijancic ............ G06F 16/212
11,645,248 B1 * 5/2023 Johnson ................ G06F 16/214 707/609
11,720,535 B2 * 8/2023 Daimler ................ G06F 16/182 707/609
12,032,515 B2 * 7/2024 Trout ....................... G06N 5/02
2005/0138606 A1 * 6/2005 Basu ......................... G06F 8/30 717/136
2005/0149537 A1 * 7/2005 Balin .................... G06F 16/214
2005/0165817 A1 * 7/2005 O'Conor ................ G06Q 10/06
2008/0140692 A1 * 6/2008 Gehring ................ G06F 16/254
2008/0281820 A1 * 11/2008 Do ........................ G06F 16/214
2009/0077014 A1 * 3/2009 Zachariah ............. G06F 16/214 707/999.005

(Continued)

FOREIGN PATENT DOCUMENTS

CN 114116673 A * 3/2022 ............. G06F 16/27
CN 114116673 B * 7/2025 ......... G06F 16/2433

*Primary Examiner* — Jean M Corrielus

(74) *Attorney, Agent, or Firm* — Lennie A. Bersh; Joshua Herman; Greenberg Traurig, LLP

(57) ABSTRACT

In some embodiments, the present disclosure provides an exemplary method that may include steps of receiving a data migration request to migrate data from a first data source to at least one second data source; determining at least one second parameter associated with at least one candidate data point of a plurality of candidate data points associated with the first data source; utilizing a trained data migration artificial intelligence module to: identify a plurality of matching data point form the plurality of candidate data points based at least in part on the at least one second parameter, and automatically migrate the data associated with the plurality of matching data points to the at least one second source; and retraining the trained data migration artificial intelligence module to form a retrained data migration module.

20 Claims, 8 Drawing Sheets

(56) References Cited

U.S. PATENT DOCUMENTS

| | | | | |
|---|---|---|---|---|
| 2012/0124081 | A1* | 5/2012 | Ebrahimi | G06F 16/214 707/769 |
| 2012/0265726 | A1* | 10/2012 | Padmanabhan | G06F 16/214 707/602 |
| 2014/0380012 | A1* | 12/2014 | Sanford | G06F 3/0673 711/165 |
| 2017/0061027 | A1* | 3/2017 | Chesla | G06F 16/955 |
| 2017/0091181 | A1* | 3/2017 | Singh | G06F 16/2365 |
| 2017/0270154 | A1* | 9/2017 | Stephens | G06F 16/24573 |
| 2019/0108223 | A1* | 4/2019 | Fabijancic | G06F 8/30 |
| 2019/0129616 | A1* | 5/2019 | Nguyen | G06F 3/0647 |
| 2020/0233600 | A1* | 7/2020 | Swamy | G06F 3/067 |
| 2021/0349865 | A1* | 11/2021 | Shah | G06F 16/288 |
| 2022/0019554 | A1* | 1/2022 | Trout | G06F 16/128 |
| 2022/0147500 | A1* | 5/2022 | Ellis | G06F 16/214 |
| 2023/0031659 | A1* | 2/2023 | Daimler | G06F 16/289 |
| 2024/0330443 | A1* | 10/2024 | Sethi | G06F 21/554 |
| 2024/0411734 | A1* | 12/2024 | Ellis | G06F 16/214 |

* cited by examiner

METHOD AND SYSTEM FOR ARTIFICIAL INTELLIGENCE-DRIVEN DATA MIGRATION AND STANDARDIZATION ACROSS SOFTWARE PLATFORMS

FIELD OF TECHNOLOGY

The present disclosure relates to computer-implemented data management systems, specifically to artificial intelligence-driven methods for data standardization and migration across software platforms.

BACKGROUND OF TECHNOLOGY

Modern organizations increasingly depend on software-driven systems to support operations across a variety of industries. Many entities, including those in manufacturing, healthcare, air traffic control, and/or defense, typically rely on established (legacy) information technology ("IT") infrastructures that have been in place for extended periods. Typically, as expectations evolve alongside technological advancements, many companies find themselves bound to outdated (legacy) computer enterprise systems, which were originally configured for long-standing operational requirements. These systems, often designed for or within a specific era of computer technology, now may present obstacles when organizations seek to enhance its enterprise computing performance, expand functionality, and/or integrate new digital solutions without causing operational disruptions. More specifically, enterprise systems use separate and distinct formats for the data housed and maintained within their platforms and databases. With internal data migration efforts potentially exceeding seven figures in additional costs—even when migration is occurring between related systems (i.e., migration of data from system version 1.0 to version 2.0)—organizations face significant financial constraints from adopting more modern IT infrastructures, regardless of operational need.

SUMMARY OF DESCRIBED SUBJECT MATTER

In one embodiment, the disclosure includes a computer-implemented method including receiving, by at least one processor, a data migration request to migrate data from a first data source to at least one second data source; where the data migration request comprises a plurality of selected data points to be migrated from the first data source to the at least one second data source; where the data is of at least one data type associated with the at least one second data source; where the first data source is at least one database or at least one data platform; where each selected data point of the plurality of selected data points is defined to have at least one first parameter; determining, by the at least one processor, at least one second parameter associated with at least one candidate data point of a plurality of candidate data points associated with the first data source based at least in part on: at least one constraint of the data migration request, and the at least one first parameter associated with each selected data point of the plurality of selected data points associated with the at least one second data source; utilizing, by the at least one processor, a trained data migration artificial intelligence module to: identify a plurality of matching data points form the plurality of candidate data points based at least in part on the at least one second parameter, and automatically migrate the data associated with the plurality of matching data points to the at least one second source; and retraining, by the at least one processor, the trained data migration artificial intelligence module based at least in part on a plurality of: at least one occurrence of the data within the at least one second data source, at least one chronological path of data entry of the data associated with the at least one occurrence of the data within the at least one second data source, a rate of the data entry of the data associated with the at least one occurrence of the data within the at least one second data source, the at least one first parameter, the at least one second parameter, and the at least one constraint of the data migration request.

In another embodiment, the disclosure includes a system including a non-transient computer memory, storing software instructions; at least one or more components of at least one processor configured to execute the software instructions that cause the at least one processor to perform steps to: receive a data migration request to migrate data from a first data source to at least one second data source; where the data migration request comprises a plurality of selected data points to be migrated from the first data source to the at least one second data source; where the data is of at least one data type associated with the at least one second data source; where the first data source is at least one database or at least one data platform; where each selected data point of the plurality of selected data points is defined to have at least one first parameter; determine at least one second parameter associated with at least one candidate data point of a plurality of candidate data points associated with the first data source based at least in part on: at least one constraint of the data migration request, and the at least one first parameter associated with each selected data point of the plurality of selected data points associated with the at least one second data source; utilize a trained data migration artificial intelligence module to: identify a plurality of matching data points from the plurality of candidate data points based at least in part on the at least one second parameter, and automatically migrate the data associated with the plurality of matching data points to the at least one second source; and retrain the trained data migration artificial intelligence module based at least in part on a plurality of: at least one occurrence of the data within the at least one second data source, at least one chronological path of data entry of the data associated with the at least one occurrence of the data within the at least one second data source, a rate of the data entry of the data associated with the at least one occurrence of the data within the at least one second data source, the at least one first parameter, the at least one second parameter, and the at least one constraint of the data migration request.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
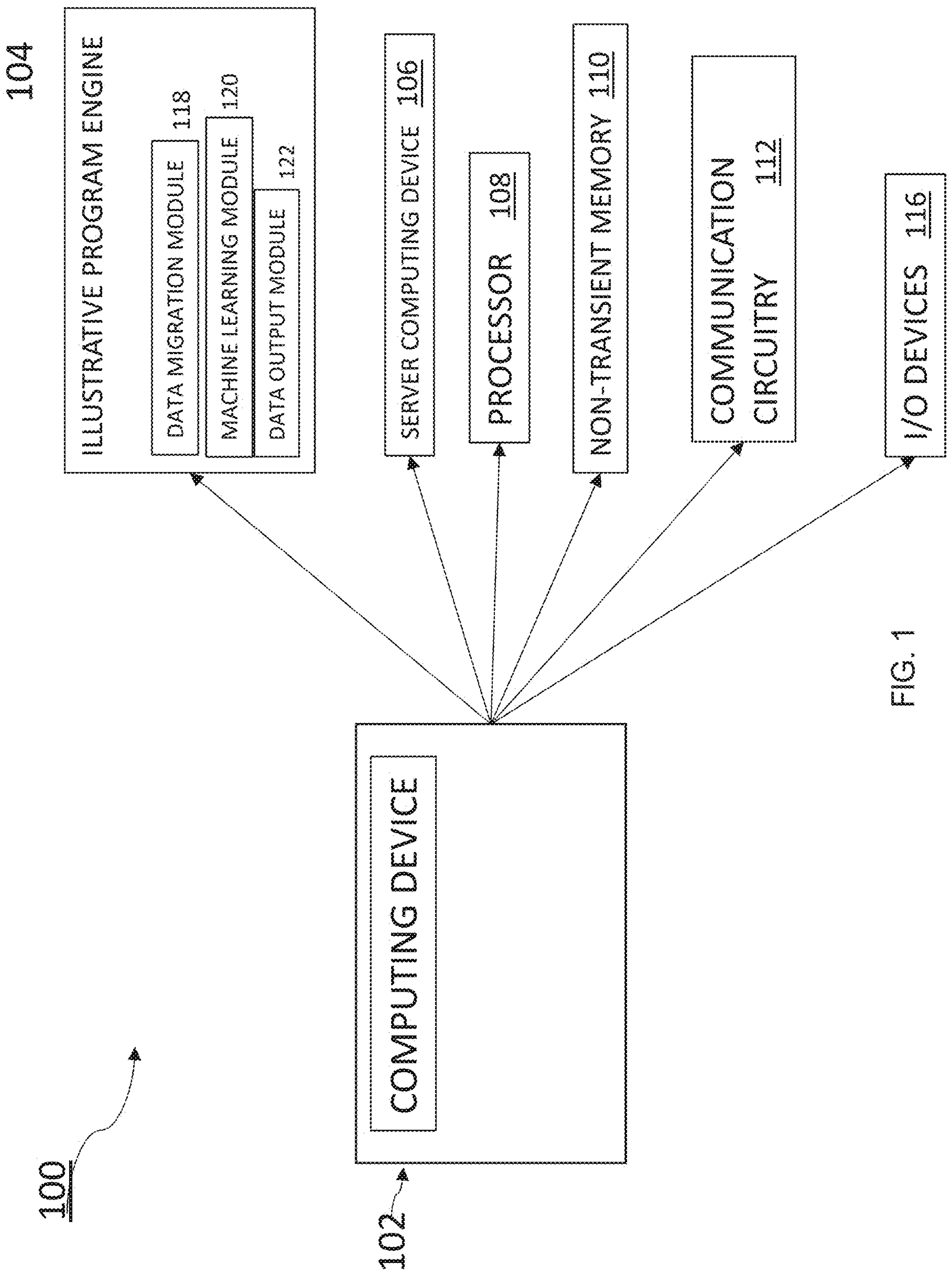
FIG. 1 depicts a block diagram of an exemplary computer-based system and platform for automatically migrating data associated with a plurality of matching data points to at least one data source, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

In at least some embodiments, the present disclosure is directed to enterprise computing systems and methods for data migration and management, particularly utilizing artificial intelligence (AI) to enable modification and automated migration of data between platforms, databases, and/or software environments that include improvements to the specific modification and migration of data learned by AI during task performance. The described technology addresses challenges linked to traditional data migration processes, such as manual intervention, schema mismatches, and inefficiencies in managing data across disparate systems, offering a technological approach that improves compatibility, minimizes errors, and enhances data handling within complex information technology environments.

The embodiments and examples described herein are provided for illustrative purposes only and are not intended to limit the scope of the described subject matter. Certain details or features that are well-known to those skilled in the art may be omitted for clarity and brevity. Furthermore, various modifications, rearrangements, or alternative implementations of the described embodiments may be made without departing from the spirit and scope of the subject matter, as defined by the appended claims.

A typical data migration and management within an enterprise IT environment may be marked by inefficiencies and/or technical challenges. Traditional approaches to data migration, particularly between SaaS platforms and/or legacy systems, often involve significant manual intervention, reliance on third-party consultants, and extended downtime. These conventional data migration methods are often susceptible to errors such as, without limitation, data truncation, schema mismatches, and/or inconsistent formatting across platforms. Additionally, the siloed nature of software platforms within organizations typically amplifies inefficiencies, as identical data points are redundantly entered into multiple databases for various departmental purposes. Such exemplary redundancy results in increased error rates, fragmented access to important data, and substantial opportunity costs in terms of time and resources.

Yet additional technological challenges during the transition between different system versions or platforms are due to data being stored in legacy formats and needs to be aligned with modern software systems that utilize different data structures and/or standards. In such legacy data-related migrations, data may be inconsistently formatted, require extensive re-formatting, or be prone to truncation and/or misinterpretation without careful manual oversight. In at least some embodiments, the present disclosure addresses one or more of above technological limitations by leveraging, without limitation, a trained data migration artificial intelligence (AI) module to facilitate modification of data, automate data migration, and omission of one or more migration steps required for subsequent data migration requests across disparate platforms. Unlike conventional methods, in at least some embodiments, the present disclosure utilizing one or more of disclosed approaches to employ specialized algorithm(s) and machine learning model(s) to identify pattern(s) in data, adapt to schema change(s), and/or optimize data structures for compatibility between various computing systems within at least one enterprise environment. For example, in at least some embodiments, the present disclosure utilizes a specific data migration module that is enabled to recalibrate data formats, align mismatched fields, and/or consolidate similar data points, thereby eliminating the need for manual intervention and/or reducing the risk of errors. Additionally, the specific data migration module can provide iterative updates, enabling the migration of data across multiple versions of a software platform without downtime or disruption.

In at least some embodiments, the present disclosure provides yet another technical solution that further incorporates a self-training mechanism, where an exemplary data migration module is configured to refine one or more capabilities associated with the data migration module based on real-time feedback from the exemplary data migration process. In at least some embodiments, the refinement aspect can include analyzing the chronological path of data entry, the rate of data movement, and/or constraints associated with specific migration requests. In at least some embodiments, by continuously self-retraining, the exemplary data migration module can omit one or more steps associated with the data migration process and apply an omission to subsequent data migration request to ensure improved performance and adaptability to evolving computing needs. In at least some embodiments, the data migration module can provide real-time reporting on the status of at least one data migration request by generating reports associated with previous data migration request based on anticipated at least one trigger event and timing for subsequent data migration requests, where the retrained data migration module can enhance data accessibility, reduce manual workload, and enable dynamic reporting and compliance with third-party requirements.

In summary, the disclosed technology represents a significant advancement over prior approaches by addressing the technical challenges of data migration through an AI-driven framework. The described framework's capacity to adapt to schema changes, automate iterative updates, and provide real-time insights positions this approach as a transformative solution for one or more entities to modernize an associated IT environments and overcome the inefficiencies of traditional data management practices while substantially reducing associated costs (including but not limited to financial cost, human resource commitments, and production down-time).

FIG. 1 depicts a block diagram of an exemplary computer-based system and platform for automatically migrating data associated with a plurality of matching data points to at least one data source, in accordance with one or more embodiments of the present disclosure.

In some embodiments, a computing system 100 may include a computing device 102 associated with a user and an illustrative program engine 104. In some embodiments, the illustrative program engine 104 may reside on the computing device 102 such as, without limitation a computing device (within an enterprise environment that is requesting a plurality of candidate data points from a legacy computer system of the enterprise). In some embodiments, the illustrative program engine 104 may reside, partially or in full, on a server computing device 106. In certain embodiments, the server computing device 106 may refer to the legacy computer system located within the enterprise environment. In some embodiments, the computing device 102 may include a processor 108, a non-transient memory 110, a communication circuitry 112 for communicating over a communication network 114 (not shown), and input and/or output (I/O) devices 116 such as a keyboard, mouse, a touchscreen, and/or a display, for example. In some embodiments, a second or external computing device (not shown) may communicate with the computing device 102.

In some embodiments, the illustrative program engine 104 may be configured to instruct the processor 108 to execute one or more software modules such as a data migration module 118, a machine learning module 120, and a data output module 122.

In some embodiments, an exemplary data migration module 118, of the present disclosure, utilizes at least one machine learning algorithm, including but not limited to supervised learning algorithms and reinforcement learning algorithmic models, described herein, to identify a plurality of matching data points from a plurality of candidate data points based on a parameter and automatically migrate data associated with the plurality of matching data points to a particular source (i.e., data destination). In some embodiments, the data migration module 118 can receive a data migration request to migrate data from a first data source to at least one second data source. In certain embodiments, the data migration request can include a plurality of selected data points to be migrated from the first data source to the at least one second data source and each selected data point of the plurality of selected data points can have at least one parameter, where the second data source may be associated with the computing device 102. In certain embodiments, the data can be of at least one data type associated with the at least one second data source. In certain embodiments, the first data source can be at least one database or at least one data platform. In some embodiments, the data migration module 118 can determine at least one second parameter associated with at least one candidate data point of a plurality of candidate data points associated with the first data source based at least in part on at least one constraint of the data migration request and the at least one first parameter with each selected data point of the plurality of selected data points associated with the at least one second data source. In some embodiments, the data migration module 118 can be retrained based on a plurality of factors associated with the data migration process to form a retrained data migration module. In certain embodiments, the plurality of factors may include at least one occurrence of the data within the at least one second data source, at least one chronological path of data entry of the data associated with the at least one occurrence of the data within the at least one second data source, a rate of the data entry of the data associated with the at least one occurrence of the data within the at least one second data source, the at least one first parameter, the at least one second parameter, and the at least one constraint of the data migration request. In certain embodiments, the retrained data migration module can omit one or more steps of the data migration process for subsequent data migration request from the at first source to the at least one second source. In some embodiments, the data migration module 118 may identify primary data, secondary data, and tertiary data within the data subject to migration. For example, primary data may refer to the main identification data tags for collected data sets, such as employee names, supplier names, account numbers, and/or agreement numbers; secondary data may refer to data aligned with primary data but not used as primary data tags, such as corporate addresses, branch office details, and/or supplier contact information; and tertiary data may refer to data points generated via automated protocols that provide additional context, such as timestamps, data status, and/or positional information within internal databases In some embodiments, the data migration module 118 may identify metadata associated with the plurality of selected data points to be migrated when receiving the data migration request. In certain embodiments, the at least one constraint associated with the data migration request can include a data integrity constraint and/or a data format compatibility constraint. In certain embodiments, the at least one second parameter can be determined based on a similarity score between the at least one candidate data point and the plurality of selected data points. In certain embodiments, the data migration module 118 can utilize a machine learning model 120 trained on historical data migration patterns. In certain embodiments, the data migration module 118 can prioritize the plurality of matching data points based on a ranking algorithm. In some embodiments, the retraining of the data migration module 118 may be performed periodically based on a predefined schedule. In certain embodiments, the retraining of the data migration module 118 may be dynamically triggered based on a threshold number of data migration requests. In certain embodiments, the rate of data entry can be determined based on a time-series analysis of the data associated with the at least one occurrence of the data within the at least one second data source. For example, the rate of data entry can range from virtually instantaneous (i.e., ~0.05 seconds) to several weeks or months based on trigger events within the environment. For example, the data migration module 118 can optimize the rate of data entry for data subject to migration based on known primary, secondary, and tertiary data between the at least two data sources. In at least some embodiments, the at least one chronological path of data entry can be determined based on a sequence of timestamps (i.e., tertiary data) associated with the primary data within the at least one second data source.

In certain embodiments, the data migration module 118 can identify a target schema associated with the at least one second data source. In some embodiments, the data migration module 118 can generate a confidence score for each of the plurality of matching data points prior to data migration. In some embodiments, the data migration module 118 can determine one or more data encryption requirements associated with the data migration request and dynamically encrypt the data prior to the data migration. In certain embodiments, the data migration module 118 can approve, revise, and/or reject data prior to migration in accordance with predetermined requirements.

In some embodiments, the data migration module 118 may utilize the machine learning module 120 to determine the at least one parameter associated with at least one candidate data point of a plurality of candidate data points associated with the first data source based on at least one constraint of the data migration request and the at least one first parameter associated with each selected data point of the plurality of selected data points associated with the at least one second data source. In some embodiments, the data migration module 118 may utilize the machine learning module 120 to identify a plurality of matching data points from the plurality of candidate data points based at least in part on the at least one second parameter and automatically migrate the data associated with the plurality of matching data points to the at least one second source. In some embodiments, the data migration module 118 can utilize the machine learning module 120 to retrain the data migration module 118 based at least in part on a plurality of at least one occurrence of the data within the at least one second data source, at least one chronological path of data entry of the data associated with the at least one occurrence of the data within the at least one second data source, a rate of the data entry of the data associated with the at least one occurrence of the data within the at least one second data source, the first parameter, the second parameter, and the at least one constraint of the data migration request.

In some embodiments, the data output module 122 can output a data migration request to migrate data from a first data source to at least one second data source. In some embodiments, the data output module 122 can output at least one candidate data point of a plurality of candidate data points associated with the first data source based on at least one constraint of the data migration request and the at least one first parameter associated with each selected data point of the plurality of selected data points associated with the at least one second data source. In some embodiments, the data output module 122 can output a plurality of matching data points from the plurality of candidate data points based on the at least one second parameter. In some embodiments, the data output module 122 can output a result associated with automatically migrating the data associated with the plurality of matching data points to the at least one second source.

In some embodiments, the non-transient memory 110 may store the data migration request to migrate data from a first data source to at least one second data source. In some embodiments, the non-transient memory 110 may store the at least one candidate data point of a plurality of candidate data points associated with the first data source based on at least one constraint of the data migration request and the at least one first parameter associated with each selected data point of the plurality of selected data points associated with the at least one second data source. In some embodiments, the non-transient memory 110 may store the plurality of matching data points from the plurality of candidate data points based on the at least one second parameter. In some embodiments, the non-transient memory 110 may store the result associated with automatically migrating the data associated with the plurality of matching data points to the at least one second source.

In some embodiments, the processor 108 can receive a data migration request to migrate data from a first data source to at least one second data source. In some embodiments, the processor 108 can determine at least one second parameter associated with at least one candidate data point of a plurality of candidate data points associated with the first data source based at least in part on at least one constraint of the data migration request and the at least one first parameter with each selected data point of the plurality of selected data points associated with the at least one second data source. In some embodiments, the processor 108 can identify a plurality of matching data points from a plurality of candidate data points based on at least one parameter and automatically migrate data associated with the plurality of matching data points to a particular source. In some embodiments, the processor 108 can retrain the data migration module 118 based on a plurality of occurrences of the data within the at least one second data source, at least one chronological path of data entry of the data associated with at least one occurrence of the data within the at least one second data source, a rate of the data entry of the data associated with the at least one occurrence of the data within the at least one second data source, the at least one first parameter, the at least one second parameter, and the at least one constraint of the data migration request.

Figure 2:
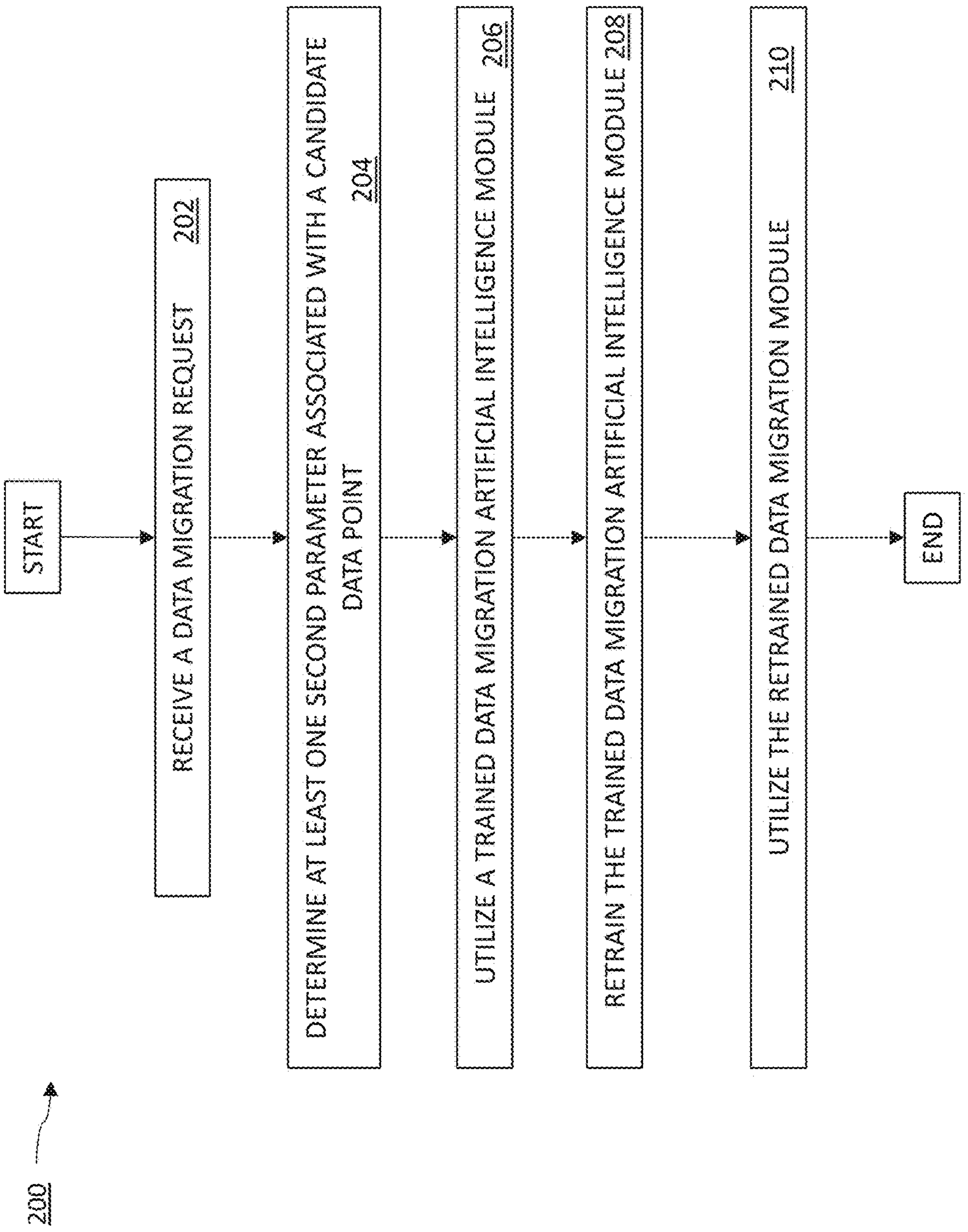
FIG. 2 is a flowchart illustrating operational steps for intaking data and evaluating data associated with a data migration request, in accordance with one or more embodiments of the present disclosure.

FIG. 2 is a flowchart 200 illustrating operational steps for retraining a trained artificial intelligence data migration module, in accordance with one or more embodiments of the present disclosure.

In step 202, the illustrative program 104 stored on the computing device 102 can receive a data migration request. In some embodiments, illustrative program 104 may receive the data migration request from a first data source to at least one second data source. In at least some embodiments, the data migration request may include a plurality of selected data points to be migration from the first data source to the at least one second data source. In some embodiments, the data may refer to a specific data type associated with the at least one second source. In at least some embodiments, each selected data point of the plurality of data point can be defined to have at least one first parameter. In some embodiments, the data migration request may include metadata associated with the plurality of selected data points to be migrated.

In step 204, the illustrative program 104 can determine at least one second parameter associated with a candidate data point. In some embodiments, the illustrative program 104 can determine the at least one second parameter associated with at least one candidate data point of a plurality of candidate data points associated with the first data source based at least in part on at least one constraint of the data migration request and the at least first parameter associated with each selected data point of the plurality of selected data points associated with the at least one second data source. In at least some embodiments, the retrained data migration module can omit the determination step of the data migration process for subsequent data migration request. In certain embodiments, the at least one constraint of the data migration request may refer to a data integrity constraint. In certain embodiments, the at least one constraint of the data migration request may refer to a data format compatibility constraint. In at least some embodiments, the at least one second parameter may be based on a similarity score between the at least one candidate data point and the plurality of selected data points.

In step 206, the illustrative program 104 can utilize a trained data migration artificial intelligence module. In some embodiments, the illustrative program 104 can utilize the trained data migration artificial intelligence module to identify a plurality of matching data points from the plurality of candidate data points based at least in part on the at least one second parameter. In some embodiments, the illustrative program 104 can utilize the trained data migration artificial intelligence module to automatically migrate the data associated with the plurality of matching data points to the at least one second source. In certain embodiments, the identification of the plurality of matching data points may correlate to a similarity score associated with the data subject to migration, where the similarity score may refer to a quantification of matching shared between the first data source and the at least second data source. In certain embodiments, the trained data migration artificial intelligence module may utilize a ranking algorithm to prioritize the plurality of matching data points associated with the data.

In step 208, the illustrative program 104 can retrain the trained data migration artificial intelligence module. In some embodiments, the illustrative program 104 can retrain the data migration artificial intelligence module based at least in part on a plurality of factors. In certain embodiments, the plurality of factors may include, but not limited to, at least one occurrence of the data within the at least one second data source, at least one chronological path of data entry of the data associated with the at least one occurrence of the data within the at least one second data source, a rate of the data entry of the data associated with the at least one occurrence of the data within the at least one second data source, the at least one first parameter, the at least one second parameter, and the at least one constrain of the data migration request. In at least some embodiments, the illustrative program 104 can retrain the data migration artificial intelligence module to form a retrained data migration module. In at least some embodiments, the retraining of the trained data migration artificial intelligence module may be performed periodically based on a predefined schedule. In at least some embodiments, the retraining of the trained data migration artificial intelligence module may be dynamically triggered based a threshold number of data migration requests. In certain embodiments, the illustrative program 104 can generate a confidence score for each of the plurality of matching data points prior to migration. In certain embodiments, the illustrative program 104 can specify a data encryption requirement and encrypt the data prior to migration to the at least one second data source. As an unrestrictive example, the retraining of the data migration artificial intelligence module can be accomplished using a refinement learning model.

In step 210, the illustrative program 104 can utilize the retrained data migration module. In some embodiments, the illustrative program 104 can utilize the retrained data migration module to omit one or more steps of the data migration process for subsequent data migration request. In at least some embodiments, the retrained data migration module can improve the performance of the computing environment by automatically migrating data with a predetermined similarity score and confidence score between at least two data sources. In at least some embodiments, the retrained data migration module can dynamically update based on historical data migration results and generate at least one real-time report on the status of the data migration request.

Figure 3:
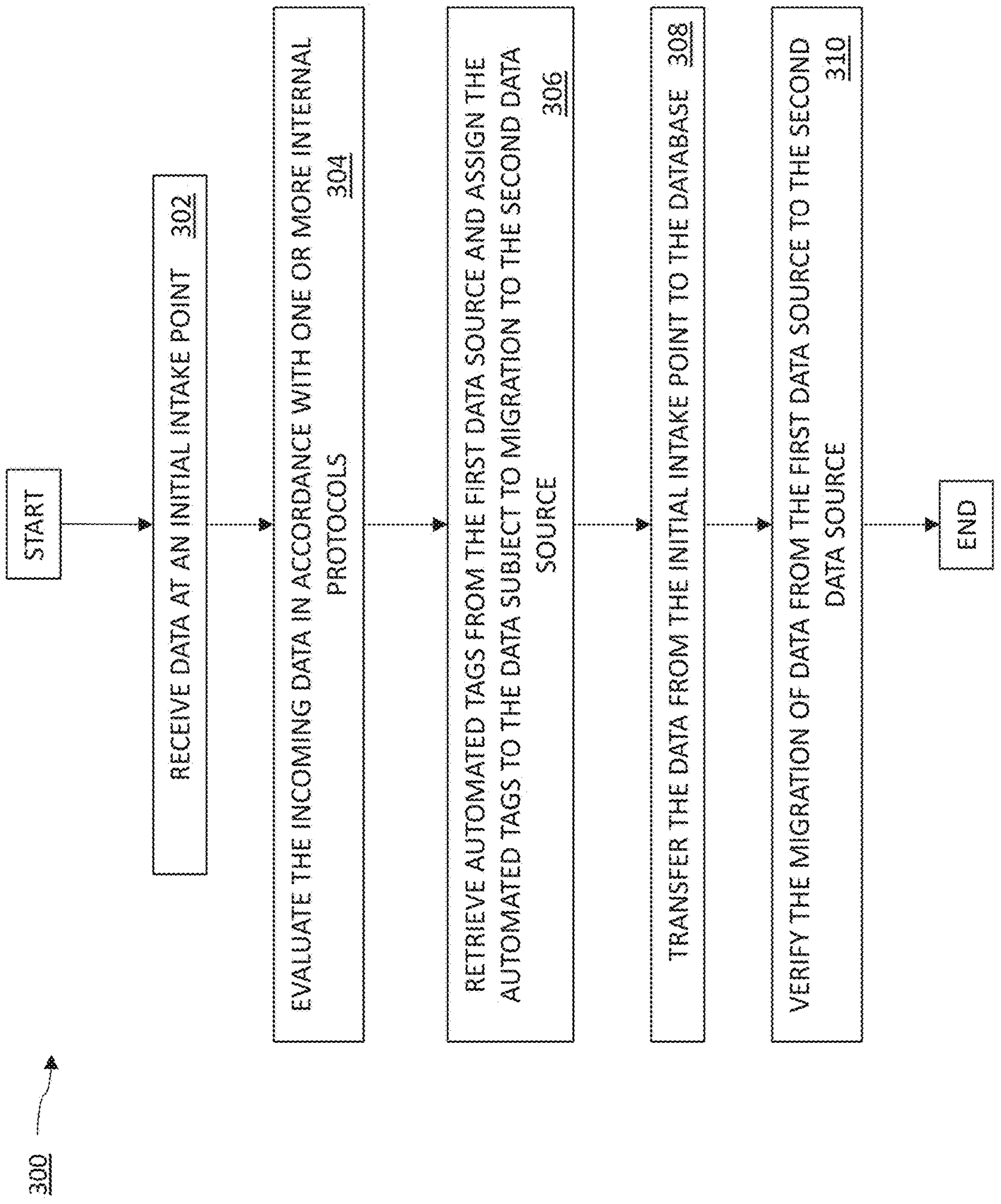
FIGS. 3 and 4 are flowcharts illustrating operational steps for (1) migrating data sets within a closed computing environment and (2) migrating modified data to additional data sources, in accordance with one or more embodiments of the present disclosure.

FIG. 3 is a flowchart 300 illustrating operational steps for intaking data and evaluating data associated with a data migration request, in accordance with one or more embodiments of the present disclosure.

In some embodiments, the data migration module 118 starts from an initial intake point (IIP) (i.e., a first data source) and culminating in the transfer of finalized data to a database (i.e., a second data source). In steps 302-310, the data migration module 118 performs multiple steps to migrate data from a first source to a second source based on a plurality of parameters and constraints. In step 302, the data may be received at an initial intake point, where the initial intake point may refer to the entry point for all incoming data. In step 304, the data migration module 118 can evaluate the incoming data in accordance with one or more internal protocols. In certain embodiments, the protocols may include verifying the IP address of at least one data source; identifying one or more markers for the data, such as historical markers and historical data sources; expanding acronyms associated with the data; and ensuring compliance with predetermined requirements associated with data substance, such as source-specific specification at the digital level. In certain embodiments, the data migration module 118 can process the data in a particular process depending on the evaluation of the data. In certain embodiments, the data migration module 118 can reject the data, revise the data, or accept the data. For example, if the data is repetitive, originates from a prohibited source, or fails to meet the predetermined requirements, the data migration module 118 can reject the data. In some embodiments, the data migration module 118 can revise the data in accordance with the predetermined requirements to meet the source-specific specifications. In some embodiments, the data migration module 118 can accept the data in response to the data meeting all the required criteria of the data source destination (i.e., the at least one second data source). In step 306, the data migration module 118 can retrieve automated tags from the at least first data source and assigns the automated tags to the data subject to migration to the at least second data source. In certain embodiments, the automated tags may include time and date stamps and chronologically or protocol-assigned ticket and/or account numbers. In step 308, the data migration module 118 can transfer the data from the IIP to the database in response to being finalized. In certain embodiments, this transfer may refer to the data being migrated from the first data source to the at least second data source. In some embodiments, the automated tags assigned to the data can be included as part of the data set during the intake process associated with the data migration. In step 310, the data migration module 118 can verify the completion of the migration of data from the first data source to the at least second data source by analyzing the first data source and the second data source to confirm the presence of the migrated data within the second data source. In some embodiments, flowchart 300 can demonstrate at least one approach of the data migration module 118 to repeatedly migrate valid, accurate, and properly tagged data in the at least one second data source. In certain embodiments, the inclusion of automated tagging and the rejection of invalid data can ensure the integrity and reliability of the migrated data within the computing device 102 for subsequent data migration requests.

Figure 4:
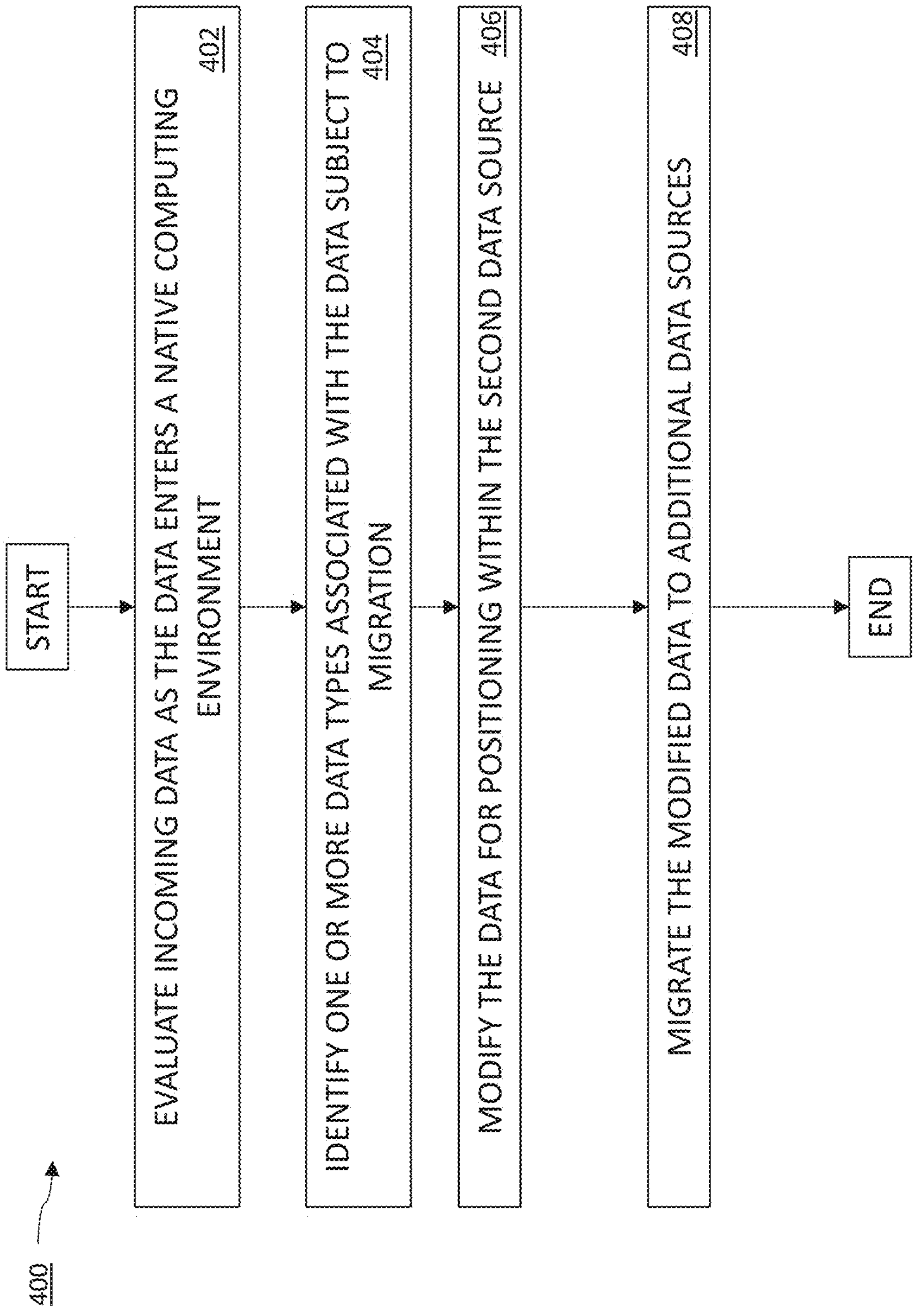

FIG. 4 is a flowchart 400 illustrating operational steps for migrating data sets within a closed computing environment, in accordance with one or more embodiments of the present disclosure.

In step 402, the data migration module 118 can evaluate incoming data as the data enters the native computing environment. In certain embodiments, the data migration module 118 can utilize a technology road map to evaluate the incoming data as the data is migrated from the native computing environment. The technology road map may refer to a foundational framework that enables the data migration module 118 to efficiently manage data migration tasks while ensuring compliance with predetermined requirements and improving data distribution. For example, the data migration module 118 can evaluate the incoming data using a data schema to analyze all relevant information associated with the data subject to migration. In certain embodiments, the data migration module 118 may receive a data migration request initiated by an internal user request, where the data migration request can originate from the native computing environment to identify a need for specific data subsets to be migrated. For example, this approach allows for on-demand migration, ensuring that data is transferred precisely when required by the user. In other examples, the data migration request can occur on a timed-release schedule, which is predetermined by the data migration module 118. In certain embodiments, the timed-release schedule may refer to the migration of data triggered by specific events or paced chronologically to ensure that data is migrated in alignment with predefined workflows or operational timelines associated with the at least one second source. In some embodiments, a trigger event associated with the time-release schedule can refer to an automated occurrence that prompts the migration of data. For example, when a new employee is added to the internal HR platform during the new hire setup process, their corresponding data set is automatically included in the internal payroll system. In some embodiments, the chronological pacing can refer to scheduling data migration based on time-sensitive requirements. For instance, a purchase order number and its associated line-item details for supplies may be automatically registered into a property management and tracking system 30 days before the earliest delivery date specified in the purchase order.

In step 404, the data migration module 118 identifies one or more data types associated with the data subject to migration. In some embodiments, the data migration module may utilize the technology road map to track the plurality of candidate data points. In certain embodiments, the data migration module 118 may utilize the technology road map during a training phase to analyze additional metadata associated with the data subject to migration. In some embodiments, the data migration module 118 may identify primary data, secondary data, and tertiary data within the data subject to migration. For example, primary data may refer to the main identification data tags for collected data sets, such as employee names, supplier names, account numbers, and/or agreement numbers; secondary data may refer to data aligned with primary data but not used as primary data tags, such as corporate addresses, branch office details, and/or supplier contact information; and tertiary data may refer to data points generated via automated protocols that provide additional context, such as timestamps, data status, and/or positional information within internal databases.

In some embodiments, the data migration module 118 can identify physical types associated with the data maintained by each data source and can determine whether data conversion is required during data migration from the first data source to the at least one second data source.

In step 406, the data migration module 118 modifies the data for efficient positioning within the at least one second data source. In some embodiments, the data migration module 118 can modify the data by organizing, grouping, translating, and/or converting the data in accordance with the technology road map to ensure the data is configured to migrate into a plurality of data sources. In some embodiments, the data migration module 118 can organize the plurality of candidate data points by isolating unrequired secondary and tertiary data during data migration streamline the process. In some embodiments, the data migration module 118 may evaluate the chronological distribution of the data subject to data migration to update and/or modify the processes flows and data paths. In certain embodiments, the data migration module 118 can utilize one or more artificial intelligence algorithms to automatically update process flows and data paths during data migration. This use of artificial intelligence algorithms can increase efficiency in data distribution.

In step 408, the data migration module 118 simultaneously migrates the modified data to additional data sources. In some embodiments, the data migration module 118 can simultaneously migrate the modified data by pushing the organized data sets and additional metadata to the plurality of data sources associated with the computing environment. In some embodiments, the simultaneous migration can ensure that the data is distributed efficiently across the computing environment, maintain consistency and integrity throughout the data migration process.

In some embodiments, the data migration module 118 can facilitate the migration of data from an existing platform (i.e., a first data source) to a new version of the platform (i.e., at least one second data source) within a closed computing environment. In some embodiments, the data migration module 118 can ensure that the migration of the data is seamless, efficient, and compliant with internal protocols, while also addressing any new data requirements introduced by the new version of the platform. In certain embodiments and when migrating to a new version of the platform within the same computing environment, the data migration module 118 may perform the same steps as recited in FIG. 3 and FIG. 4 with the additional of evaluating the plurality of selected data points within the plurality of candidate data points needed by the new version of the platform including any additional requirements that may not have been present in the existing platform. In certain embodiments, the data migration module 118 can update the technology road map to include the new version of the platform by mapping primary and secondary data subsets from the plurality of data sources.

In some embodiments, the data migration module 118 can retrieve data from the first data source to meet the data entry requirements of the at least one second data source, and during this retrieval, identify any data requirements that are not currently collected within the computing environments. In some embodiments, the data migration module 118 can generate one or more user alerts (i.e., notifications) to notify users associated with the at least one second data source of any missing data in response to the data subject to migration failing to meet one or more predetermined parameters. In some embodiments, the data migration module 118 can validate the conformance of the data subject to migration to ensure the data meets all required standards associated with the at least one second data source and is ready for migration.

In certain embodiments, the data migration module 118 can supports real-time migration of validated data sets and subsets into the new version of the platform based on one or more user requests generated within the new version of the platform. During this real-time migration, the data migration module 118 can track the position of migrated data in real time and provide position reports in response to user queries. This capability ensures that users have immediate access to the data they need and can monitor its status within the system. In some embodiments, the data migration module 118 can manage a plurality of complex data migration tasks by leveraging the technology road map and providing real-time tracking and alerts to ensure that the transition from the first data source to the at least one second data source is both efficient, reliable, and repeatable.

In certain embodiments, the data migration module 118 can manage the generation and submission of external reports based on predefined templates associated with the data migration. These external report templates may refer to structured lists of required data sets mandated by third parties, such as government agencies, regulatory bodies, or contractual agreements. In some embodiments, a user cannot modify or reject the requirements of these templates to ensure strict compliance with external obligations. In some embodiments, these external report templates can specify the data sets required for submission to third parties, including but not limited to, SEC filings, small business subcontracting reports (ISR, SSR), notices required by FAR 52.244-2, and subcontract funding allocation reports (e.g., FAR 52.204-10). In some embodiments, the data migration module 118 may utilize the machine learning module 120 to retrieve the external report template and analyze each requirement. This analysis can involve comparing the template's data requirements to the data subject to migration and the technology road map. In some embodiments, data migration module can map the plurality of data requirements specified in each report template to the corresponding data subject to migration. In some embodiments, the data migration module 118 can interpret the template requirements against existing data sets and subsets. For example, if the report calls for "total company revenue," the data migration module 118 identifies multiple data points across internal databases that, when aggregated, fulfill this requirement. In some embodiments, the data migration module 118 to determine the specific data types needed to populate the report template. In some embodiments, the data migration module 118 can generate a report template roadmap, which may refer to a process workflow designed to efficiently pull data from the closed computing environment for report population. In certain embodiments, data migration module 118 can retrieve data from the plurality of data sources within the computing environment. In some embodiments, the data migration module 118 can revise the data subject to migration to ensure the data meets the requirements of the external report template.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others. For the purposes of this disclosure, a quantum computing device is considered to be a computing device.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, quantum computers, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, quantum computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11 ™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile; ™ (20) Microsoft DirectX™; (21).NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the data migration module 118 of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent transactions/users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

In some embodiments, the exemplary inventive computer-based systems/platforms, the exemplary inventive computer-based devices, and/or the exemplary inventive computer-based components of the present disclosure may be configured to securely store and/or transmit data (e.g., tokenized PAN numbers, etc.) by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 5:
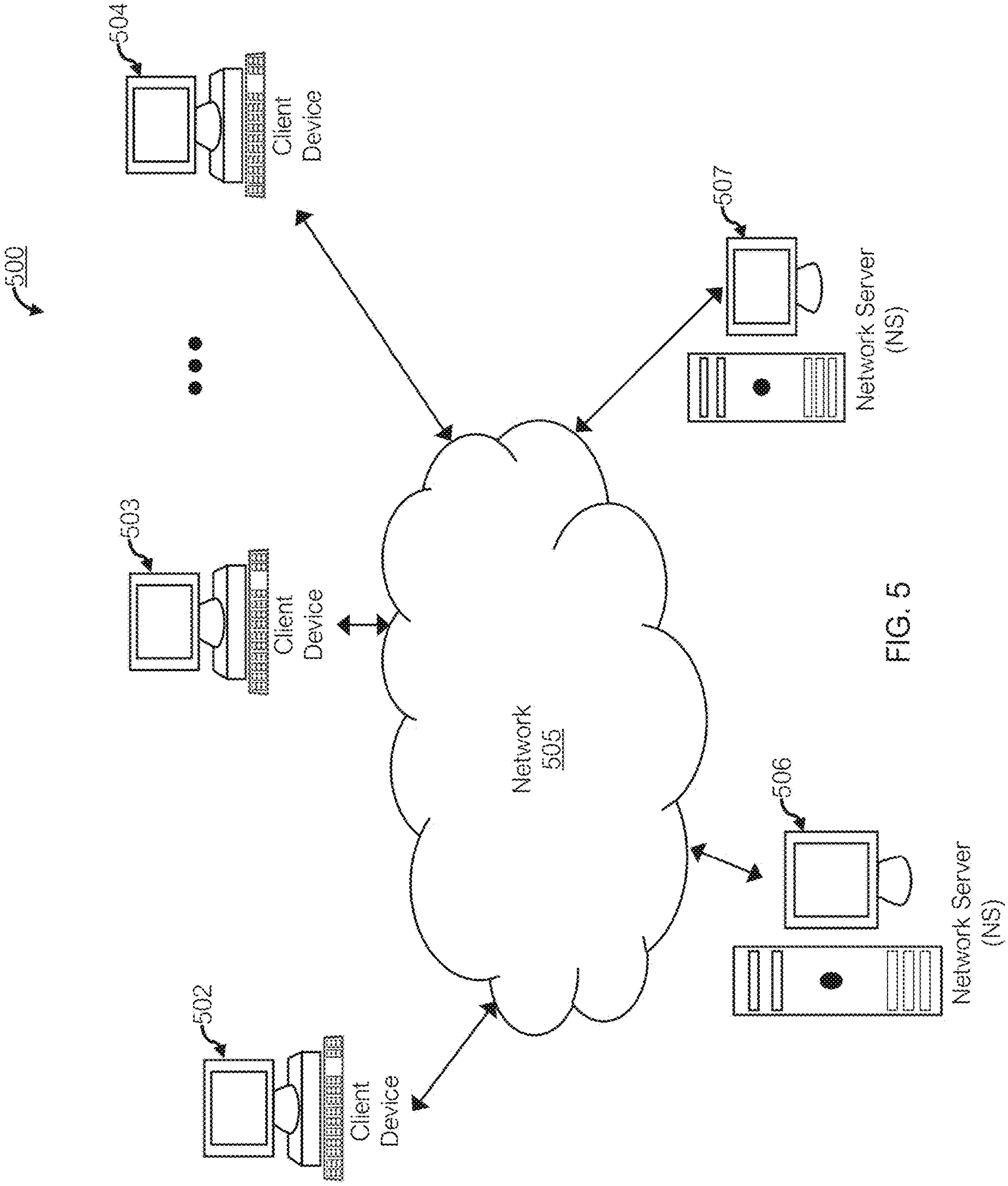
FIG. 5 depicts a block diagram of an exemplary computer-based system/platform in accordance with one or more embodiments of the present disclosure.

FIG. 5 depicts a block diagram of an exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 500 may be configured to manage a large number of members and/or concurrent transactions, as detailed herein. In some embodiments, the exemplary computer-based system/platform 500 may be based on a scalable computer and/or network architecture that incorporates various strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 500 may be configured to manage the data migration module 118 of the present disclosure, utilizing at least one machine-learning model described herein.

In some embodiments, referring to FIG. 5, members 502-504 (e.g., clients) of the exemplary computer-based system/platform 500 may include virtually any computing device capable of receiving and sending a message over a network (e.g., cloud network), such as network 505, to and from another computing device, such as servers 506 and 507, each other, and the like. In some embodiments, the member devices 502-504 may be personal computers, multiprocessor systems, microprocessor-based or programmable consumer electronics, network PCs, quantum computers, and the like. In some embodiments, one or more member devices within member devices 502-504 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 502-504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 502-504 may run one or more applications, such as Internet browsers, mobile applications, voice calls, videoconferencing, and email, among others. In some embodiments, one or more member devices within member devices 502-504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 502-504 may be specifically programmed by either Java, .Net, QT, C, C++ and/or other suitable programming language. In some embodiments, one or more member devices within member devices 502-504 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 505 may also include mass storage, such as network attached storage (NAS), a storage area network (SAN), a content delivery network (CDN) or other forms of computer or machine-readable media.

In some embodiments, the exemplary server 506 or the exemplary server 507 may be a web server (or a series of servers) running a network operating system, examples of which may include but are not limited to Microsoft Windows Server, Novell NetWare, or Linux. In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 501-504.

In some embodiments and, optionally, in combination of any embodiment described above or below, for example, one or more exemplary computing member devices 502-504, the exemplary server 506, and/or the exemplary server 507 may include a specifically programmed software module that may be configured to send, process, and receive information (e.g., transactions, VCNs, etc.) using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
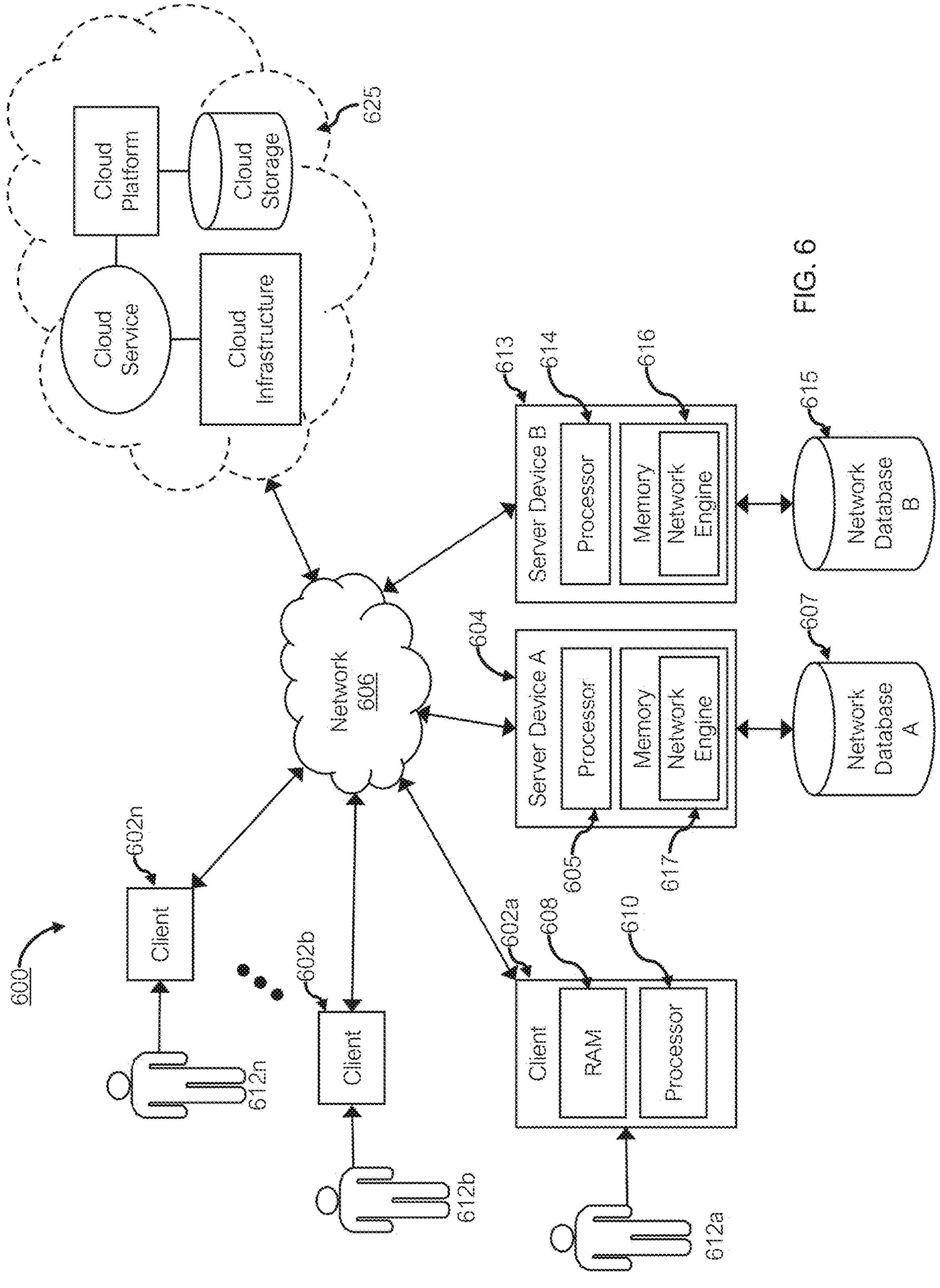
FIG. 6 depicts a block diagram of another exemplary computer-based system/platform in accordance with one or more embodiments of the present disclosure.

FIG. 6 depicts a block diagram of another exemplary computer-based system/platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 602*a*, 602*b* thru 602*n* shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, and/or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of client 602*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 602*a* through 602*n* may also comprise a number of external or internal devices such as a mouse, a CD-ROM, DVD, a physical or virtual keyboard, a display, a speaker, or other input or output devices. In some embodiments, examples of member computing devices 602*a* through 602*n* (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, member computing devices 602*a* through 602*n* may be specifically programmed with one or more application programs in accordance with one or more principles/methodologies detailed herein. In some embodiments, member computing devices 602*a* through 602*n* may operate on any operating system capable of supporting a browser or browser-enabled application, such as Microsoft™, Windows™, and/or Linux. In some embodiments, member computing devices 602*a* through 602*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 602*a* through 602*n*, users, 612*a* through 612*n*, may communicate over the exemplary network 606 with each other and/or with other systems and/or devices coupled to the network 606. As shown in FIG. 6, exemplary server devices 604 and 613 may be also coupled to the network 606. Exemplary server device 604 may include a processor 605 coupled to a memory that stores a network engine 617. Exemplary server device 613 may include a processor 614 coupled to a memory 616 that stores a network engine. In some embodiments, one or more member computing devices 602*a* through 602*n* may be mobile clients. As shown in FIG. 6, the network 606 may be coupled to a cloud computing/architecture(s) 625. The cloud computing/architecture(s) 625 may include a cloud service coupled to a cloud infrastructure and a cloud platform, where the cloud platform may be coupled to a cloud storage.

In some embodiments, at least one database of exemplary databases 607 and 615 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
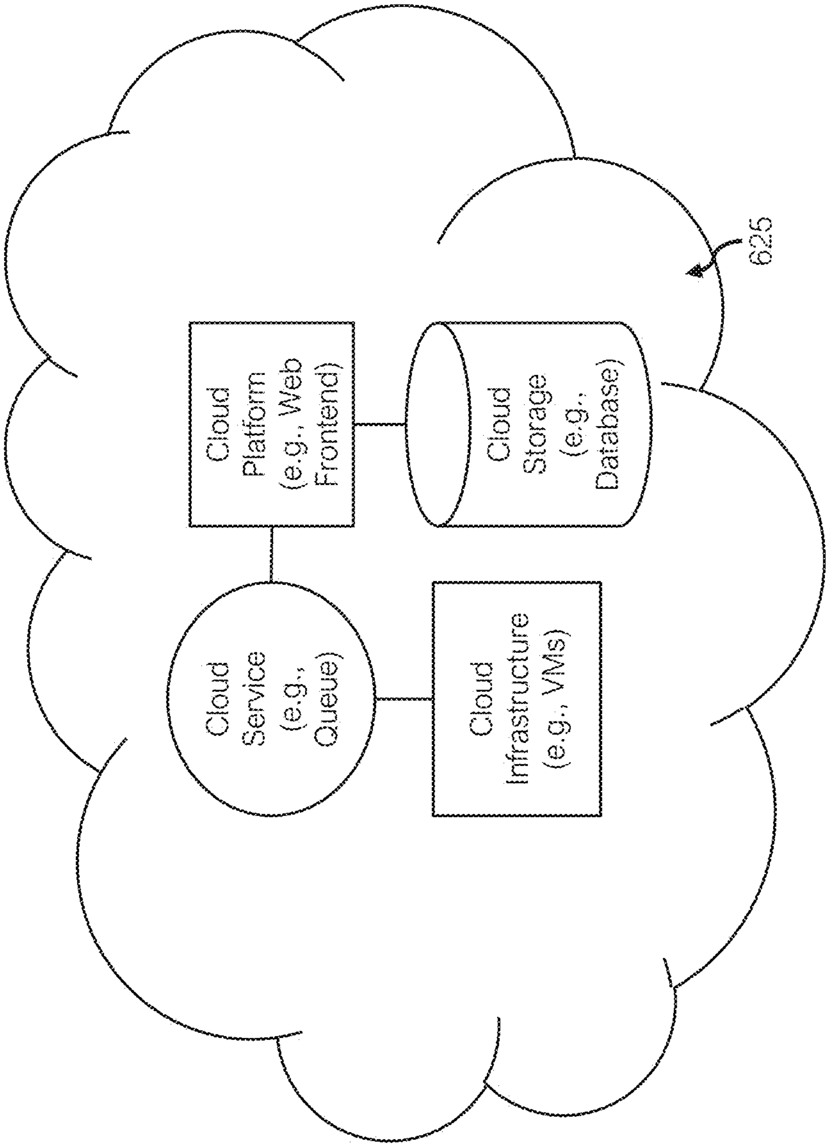
FIGS. 7 and 8 are diagrams illustrating implementations of cloud computing architecture/aspects with respect to which the disclosed technology may be specifically configured to operate, in accordance with one or more embodiments of the present disclosure.
Figure 8:
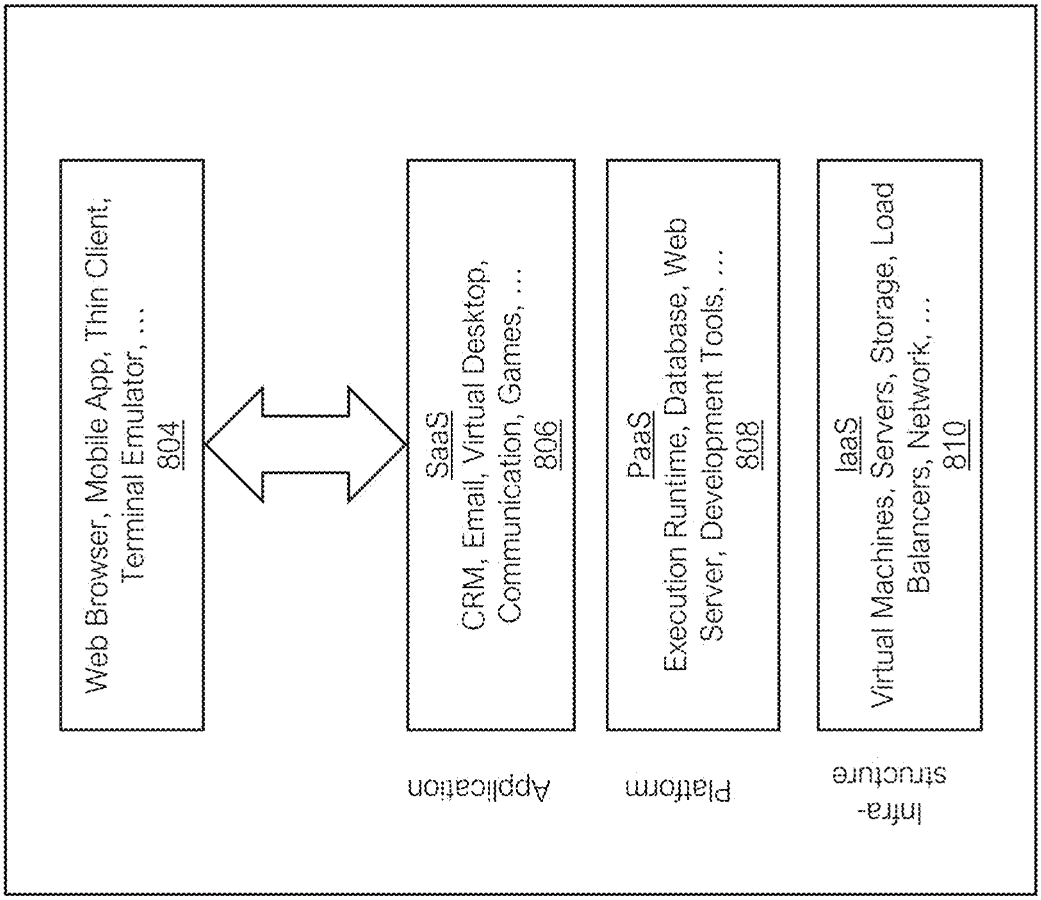

FIG. 7 and FIG. 8 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 7 illustrates an expanded view of the cloud computing/architecture(s) 625 found in FIG. 6. FIG. 8 illustrates the exemplary inventive computer-based components of the present disclosure may be specifically configured to operate in the cloud computing/architecture 625 as a source database 804, where the source database 804 may be a web browser, a mobile application, a thin client, and a terminal emulator. In FIG. 8, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS) 810, platform as a service (PaaS) 808, and/or software as a service (SaaS) 806.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naïve Bayes, bagging, random forests, and the like. In some embodiments and, optionally, in combination of any embodiment described above or below, an exemplary neutral network technique may be one of, without limitation, an artificial recurrent neural network model, a long short-term memory ("LSTM") model, and a distributed long short-term memory ("DLS™") model, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

Clause 1. A computer-implemented method may include: receiving, by at least one processor, a data migration request to migrate data from a first data source to at least one second data source; where the data migration request comprises a plurality of selected data points to be migrated from the first data source to the at least one second data source; where the data is of at least one data type associated with the at least one second data source; where the first data source is at least one database or at least one data platform; where each selected data point of the plurality of selected data points is defined to have at least one first parameter; determining, by the at least one processor, at least one second parameter associated with at least one candidate data point of a plurality of candidate data points associated with the first data source based at least in part on: at least one constraint of the data migration request, and the at least one first parameter associated with each selected data point of the plurality of selected data points associated with the at least one second data source; utilizing, by the at least one processor, a trained data migration artificial intelligence module to: identify a plurality of matching data points form the plurality of candidate data points based at least in part on the at least one second parameter, and automatically migrate the data associated with the plurality of matching data points to the at least one second source; and retraining, by the at least one processor, the trained data migration artificial intelligence module to form a retrained data migration module based at least in part on a plurality of: at least one occurrence of the data within the at least one second data source, at least one chronological path of data entry of the data associated with the at least one occurrence of the data within the at least one second data source, a rate of the data entry of the data associated with the at least one occurrence of the data within the at least one second data source, the at least one first parameter, the at least one second parameter, and the at least one constraint of the data migration request.

Clause 2. The method according to clause 1, where the data migration request further includes metadata associated with the plurality of selected data points to be migrated.

Clause 3. The method according to clause 1 or 2, where the at least one constraint of the data migration request includes a data integrity constraint.

Clause 4. The method according to clause 1, 2 or 3, where the at least one constraint of the data migration request includes a data format compatibility constraint.

Clause 5. The method according to clause 1, 2, 3 or 4, where the at least one second parameter is determined based on a similarity score between the at least one candidate data point and the plurality of selected data points.

Clause 6. The method according to clause 1, 2, 3, 4 or 5, where the trained data migration artificial intelligence module is configured to utilize a machine learning model trained on historical data migration patterns.

Clause 7. The method according to clause 1, 2, 3, 4, 5 or 6, where the trained data migration artificial intelligence module is further configured to prioritize the plurality of matching data points based on a ranking algorithm.

Clause 8. The method according to clause 1, 2, 3, 4, 5, 6 or 7, where the retraining of the trained data migration artificial intelligence module is performed periodically based on a predefined schedule.

Clause 9. The method according to clause 1, 2, 3, 4, 5, 6, 7, or 8, where the retraining of the trained data migration artificial intelligence module is triggered dynamically based on a threshold number of data migration requests.

Clause 10. The method according to clause 1, 2, 3, 4, 5, 6, 7, 8 or 9, where the rate of data entry is determined based on a time-series analysis of the data associated with the at least one occurrence of the data within the at least one second data source.

Clause 11. The method according to clause 1, 2, 3, 4, 5, 6, 7, 8, 9 or 10, where the at least one chronological path of data entry is determined based on a sequence of timestamps associated with the data within the at least one second data source.

Clause 12. The method according to clause 1, 2, 3, 4, 5, 6, 7, 8, 9, 10 or 11, where the data migration request further specifies a target schema for the at least one second data source and transforming the data to conform to the target schema prior to migration.

Clause 13. The method according to clause 1, 2, 3, 4, 5, 6, 7, 8, 9, 10, 11 or 12, where the trained data migration artificial intelligence module is configured to generate a confidence score for each of the plurality of matching data points prior to migration.

Clause 14. The method according to clause 1, 2, 3, 4, 5, 6, 7, 8, 9, 10, 11, 12, or 13, where the retraining of the trained data migration artificial intelligence module further considers user feedback associated with prior data migration operations.

Clause 15. The method according to clause 1, 2, 3, 4, 5, 6, 7, 8, 9, 10, 11, 12, 13, or 14, where the retrained data migration module omits at least one step of a data migration process for subsequent data migration requests.

Clause 16. A computer-implemented method may include: receiving, by at least one processor, a data migration request to migrate data from a particular data source to a plurality of data sources, data migration request includes a plurality of selected data points to be migrated from the particular data source to the plurality of data sources; where the data is of at least one data type associated with the plurality of data sources; where the particular source is at least one database or at least one data platform; where each selected data point of the plurality of selected data points is defined to have at least one first parameter, determining, by the at least one processor, at least one second parameter associated with at least one candidate data point of a plurality of candidate data points within the plurality of selected data points based on at least one constraint of the data migration request; utilizing, by the at least one processor, a trained artificial intelligence module to automatically migrate the data to the plurality of data sources, where the trained data migration artificial intelligence module is configured to comprise a plurality of relationships between: at least one occurrence of the data within the plurality of data sources, at least one chronological path of data entry of the data associated with the at least one occurrence of the data within the plurality of data sources, a rate of the data entry of the data associated with the at least one occurrence of the data within the plurality of data sources, the at least one first parameter, the at least one second parameter, and the at least one constraint of the data migration request; where the trained data migration artificial intelligence module omits at least one step of a data migration process for subsequent data migration requests; providing, by the at least one processor, at least one real-time report on the status of the data migration request of the plurality of selected data points, where the at least one real-time report comprises anticipated timing of trigger events required for subsequent migration of the plurality of selected data points to the plurality of data sources; and organizing, by the at least one processor, the plurality of selected points set based on a set of predetermined parameters.

Clause 17. The method according to clause 16, where the trained data migration artificial intelligence module is further configured to prioritize the plurality of matching data points based on a ranking algorithm.

Clause 18. The method according to clause 16 or 17, where the data migration request further specifies a target schema for the at least one second data source and transforms the data to conform to the target schema prior to migration.

Clause 19. The method according to clause 16, 17, or 18, where the data migration request further specifies a data encryption requirement and encrypts the data prior to migration to the at least one second data source.

Clause 20. A system may include: a non-transient computer memory, storing software instructions; at least one or more components of at least one processor configured to execute the software instructions that cause the at least one processor to perform steps to: receive a data migration request to migrate data from a first data source to at least one second data source; where the data migration request comprises a plurality of selected data points to be migrated from the first data source to the at least one second data source; where the data is of at least one data type associated with the at least one second data source; where the first data source is at least one database or at least one data platform; where each selected data point of the plurality of selected data points is defined to have at least one first parameter; determine at least one second parameter associated with at least one candidate data point of a plurality of candidate data points associated with the first data source based at least in part on: at least one constraint of the data migration request, and the at least one first parameter associated with each selected data point of the plurality of selected data points associated with the at least one second data source; utilize a trained data migration artificial intelligence module to: identify a plurality of matching data points from the plurality of candidate data points based at least in part on the at least one second parameter, and automatically migrate the data associated with the plurality of matching data points to the at least one second source; and retrain the trained data migration artificial intelligence module to form a retrained data migration module based at least in part on a plurality of: at least one occurrence of the data within the at least one second data source, at least one chronological path of data entry of the data associated with the at least one occurrence of the data within the at least one second data source, a rate of the data entry of the data associated with the at least one occurrence of the data within the at least one second data source, the at least one first parameter, the at least one second parameter, and the at least one constraint of the data migration request.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A computer-implemented method, comprising:

receiving, by at least one processor, a data migration request to migrate data from a first data source to at least one second data source;

wherein the data migration request comprises a plurality of selected data points to be migrated from the first data source to the at least one second data source;

wherein the data is of at least one data type associated with the at least one second data source;

wherein the first data source is at least one database or at least one data platform;

wherein each selected data point of the plurality of selected data points is defined to have at least one first parameter;

determining, by the at least one processor, at least one second parameter associated with at least one candidate data point of a plurality of candidate data points associated with the first data source based at least in part on:

at least one constraint of the data migration request, and the at least one first parameter associated with each selected data point of the plurality of selected data points associated with the at least one second data source;

wherein the at least one second parameter is determined based on a similarity score between the at least one candidate and the plurality of selected data points, wherein the data migration request further specifies a target schema associated with the at least one second data source;

utilizing, by the at least one processor, a trained data migration artificial intelligence module to:

identify a plurality of matching data points from the plurality of candidate data points based at least in part on the at least one second parameter, generate, for each identified matching data point and prior to migration, a confidence score for each of the plurality of matching data points, prioritize the identified plurality of matching data points based on a ranking algorithm associated with the confidence score, determine, based on the target schema associated with the at least one second data source, whether data conversion is required for the prioritized plurality of matching data points during migration from the first data source to the at least one second data source, transform the data associated with the prioritized plurality of matching data points to conform with the target schema prior to migration by recalibrating data formats and aligning fields when data conversion is required, and automatically migrate the data associated with the prioritized plurality of matching data points to the at least one second source;

wherein the trained data migration artificial intelligence module is configured to automatically reconcile schema differences, standardize data formats, and prevent data truncation during migration to eliminate redundant entry of identical data points into multiple databases, thereby reducing error rates, improving access to migrated data, and minimizing opportunity costs in terms of time and resources during migration; and retraining, by the at least one processor, the trained data migration artificial intelligence module to form a retrained data migration module based at least in part on a plurality of:

at least one occurrence of the data within the at least one second data source, at least one chronological path of data entry of the data associated with the at least one occurrence of the data within the at least one second data source, a rate of the data entry of the data associated with the at least one occurrence of the data within the at least one second data source, the at least one first parameter, the at least one second parameter, and the at least one constraint of the data migration request.

2. The computer-implemented method of claim 1, wherein the data migration request further comprises metadata associated with the plurality of selected data points to be migrated.

3. The computer-implemented method of claim 1, wherein the at least one constraint of the data migration request includes a data integrity constraint.

4. The computer-implemented method of claim 1, wherein the at least one constraint of the data migration request includes a data format compatibility constraint.

5. The computer-implemented method of claim 1, wherein the at least one second parameter is determined based on the similarity score between the at least one candidate data point and the plurality of selected data points, wherein the similarity score comprises a quantification of matching shared between the first data source and the at least one second data source.

6. The computer-implemented method of claim 1, wherein the trained data migration artificial intelligence module is configured to utilize a machine learning model trained on historical data migration patterns.

7. The computer-implemented method of claim 1, wherein the trained data migration artificial intelligence module is further configured to prioritize the plurality of matching data points based on a ranking algorithm.

8. The computer-implemented method of claim 1, wherein the retraining of the trained data migration artificial intelligence module is performed periodically based on a predefined schedule.

9. The computer-implemented method of claim 1, wherein the retraining of the trained data migration artificial intelligence module is triggered dynamically based on a threshold number of data migration requests.

10. The computer-implemented method of claim 1, wherein the rate of data entry is determined based on a time-series analysis of the data associated with the at least one occurrence of the data within the at least one second data source.

11. The computer-implemented method of claim 1, wherein the at least one chronological path of data entry is determined based on a sequence of timestamps associated with the data within the at least one second data source.

12. The computer-implemented method of claim 1, wherein the data migration request further specifies a target schema for the at least one second data source and transforms the data to conform to the target schema prior to migration.

13. The computer-implemented method of claim 1, wherein the trained data migration artificial intelligence module is configured to generate a confidence score for each of the plurality of matching data points prior to migration.

14. The computer-implemented method of claim 1, wherein the retraining of the trained data migration artificial intelligence module further considers user feedback associated with prior data migration operations.

15. The computer-implemented method of claim 1, wherein the retrained data migration module omits at least one step of a data migration process for subsequent data migration requests.

16. A computer-implemented method, comprising:

receiving, by at least one processor, a data migration request to migrate data from a particular data source to a plurality of data sources, data migration request comprises a plurality of selected data points to be migrated from the particular data source to the plurality of data sources;

wherein the data is of at least one data type associated with the plurality of data sources;

wherein the particular source is at least one database or at least one data platform;

wherein each selected data point of the plurality of selected data points is defined to have at least one first parameter, determining, by the at least one processor, at least one second parameter associated with at least one candidate data point of a plurality of candidate data points within the plurality of selected data points based on at least one constraint of the data migration request, wherein the at least one second parameter is determined based on a similarity score between the at least one candidate data point and the plurality of selected data points, wherein the data migration request further specifies a target schema associated with the at least one second data source; and utilizing, by the at least one processor, a trained artificial intelligence module to;

identify a plurality of matching data points from the plurality of candidate data points based at least in part on the at least one second parameter, generate, for each identified matching data point and prior to migration, a confidence score for each of the plurality of matching data points, prioritize the identified plurality of matching data points based on a ranking algorithm associated with the confidence score, determine, based on the target schema associated with the at least one second data source, whether data conversion is required for the prioritized plurality of matching data points during migration from the first data source to the at least one second data source, transform the data associated with the prioritized plurality of matching data points to conform with the target schema prior to migration by recalibrating data formats and aligning fields when data conversion is required, and automatically migrate the data to the plurality of data sources, wherein the trained data migration artificial intelligence module is configured to comprise a plurality of relationships between:

at least one occurrence of the data within the plurality of data sources, at least one chronological path of data entry of the data associated with the at least one occurrence of the data within the plurality of data sources, a rate of the data entry of the data associated with the at least one occurrence of the data within the plurality of data sources, the at least one first parameter, the at least one second parameter, and the at least one constraint of the data migration request;

wherein the trained data migration artificial intelligence module omits at least one step of a data migration process for subsequent data migration requests;

wherein the trained data migration artificial intelligence module is configured to automatically reconcile schema differences, standardize data formats, and prevent data truncation during migration to eliminate redundant entry of identical data points into multiple databases, thereby reducing error rates, improving access to migrated data, and minimizing opportunity costs in terms of time and resources during migration;

providing, by the at least one processor, at least one real-time report on the status of the data migration request of the plurality of selected data points, wherein the at least one real-time report comprises anticipated timing of trigger events required for subsequent migration of the plurality of selected data points to the plurality of data sources; and organizing, by the at least one processor, the plurality of selected points set based on a set of predetermined parameters.

17. The method of claim 16, wherein the trained data migration artificial intelligence module is further configured to prioritize the plurality of matching data points based on a ranking algorithm.

18. The method of claim 16, wherein the data migration request further specifies a target schema for the at least one second data source and transforms the data to conform to the target schema prior to migration.

19. The method of claim 16, wherein the data migration request further specifies a data encryption requirement and encrypts the data prior to migration to the at least one second data source.

20. A system comprising:

a non-transient computer memory, storing software instructions;

at least one or more components of at least one processor configured to execute the software instructions that cause the at least one processor to perform steps to:

receive a data migration request to migrate data from a first data source to at least one second data source;

wherein the data migration request comprises a plurality of selected data points to be migrated from the first data source to the at least one second data source;

wherein the data is of at least one data type associated with the at least one second data source;

wherein the first data source is at least one database or at least one data platform;

wherein each selected data point of the plurality of selected data points is defined to have at least one first parameter;

determine at least one second parameter associated with at least one candidate data point of a plurality of candidate data points associated with the first data source based at least in part on:

at least one constraint of the data migration request, and the at least one first parameter associated with each selected data point of the plurality of selected data points associated with the at least one second data source;

wherein the at least one second parameter is determined based on a similarity score between the at least one candidate data point and the plurality of selected data points, wherein the data migration request further specifies a target schema associated with the at least one second data source;

utilize a trained data migration artificial intelligence module to:

identify a plurality of matching data points from the plurality of candidate data points based at least in part on the at least one second parameter, generate, for each identified matching data point and prior to migration, a confidence score for each of the plurality of matching data points, prioritize the identified plurality of matching data points based on a ranking algorithm associated with the confidence score, determine, based on the target schema associated with the at least one second data source, whether data conversion is required for the prioritized plurality of matching data points during migration from the first data source to the at least one second data source, transform the data associated with the prioritized plurality of matching data points to conform with the target schema prior to migration by recalibrating data formats and aligning fields when data conversion is required, and automatically migrate the data associated with the plurality of matching data points to the at least one second source;

wherein the trained data migration artificial intelligence module is configured to automatically reconcile schema differences, standardize data formats, and prevent data truncation during migration to eliminate redundant entry of identical data points into multiple databases, thereby reducing error rates, improving access to migrated data, and minimizing opportunity costs in terms of time and resources during migration; and retrain the trained data migration artificial intelligence module to form a retrained data migration module based at least in part on a plurality of:

at least one occurrence of the data within the at least one second data source, at least one chronological path of data entry of the data associated with the at least one occurrence of the data within the at least one second data source, a rate of the data entry of the data associated with the at least one occurrence of the data within the at least one second data source, the at least one first parameter, the at least one second parameter, and the at least one constraint of the data migration request.

* * * * *